United States Patent [19]

Skinner

[11] 4,305,439
[45] Dec. 15, 1981

[54] WOODWORKING FIXTURE

[76] Inventor: Charles D. Skinner, 5237 Nannette St., Bonita, Calif. 92002

[21] Appl. No.: 47,281

[22] Filed: Jun. 11, 1979

[51] Int. Cl.³ .............................................. B27C 5/10
[52] U.S. Cl. .............................. 144/134 A; 33/27 L; 144/136 R; 409/220; 409/221; 409/224; 409/227
[58] Field of Search ........... 144/134 R, 134 A, 136 R, 144/309 A, 323, 2 R; 409/219, 220, 221, 224, 225, 226, 227; 269/69, 71, 73; 33/26, 27 R, 27 G, 27 L

[56] References Cited

U.S. PATENT DOCUMENTS

| | | | |
|---|---|---|---|
| 1,113,404 | 10/1914 | Blair | 33/26 |
| 2,353,891 | 7/1944 | Gruntorad | 269/71 |
| 2,371,435 | 3/1945 | Galorneau | 269/71 |
| 2,425,982 | 8/1947 | Bazley | 409/225 |
| 2,561,436 | 7/1951 | Bachmann | 33/27 L |
| 3,299,779 | 1/1967 | Wolf | 144/134 R |
| 3,998,127 | 12/1976 | Romeu | 409/224 |
| 4,112,986 | 9/1978 | Strange et al. | 144/309 A |

FOREIGN PATENT DOCUMENTS 2242193  8/1974  France .................. 409/224

Primary Examiner—W. D. Bray
Attorney, Agent, or Firm—Henri J. A. Charmasson

[57] ABSTRACT

A woodworking fixture for positioning and guiding a workpiece under a stationary routing head, whereby the workpiece is subject to a composite movement as it progresses under the routing head. The fixture comprises an indexing table having a clamp for securing the workpiece thereon, mounted on a moveable carriage. The indexing table can be slanted at an adjustable angle and may be rotated as the carriage progresses under the routing head in order to create designs of varying depth into the workpiece.

7 Claims, 10 Drawing Figures

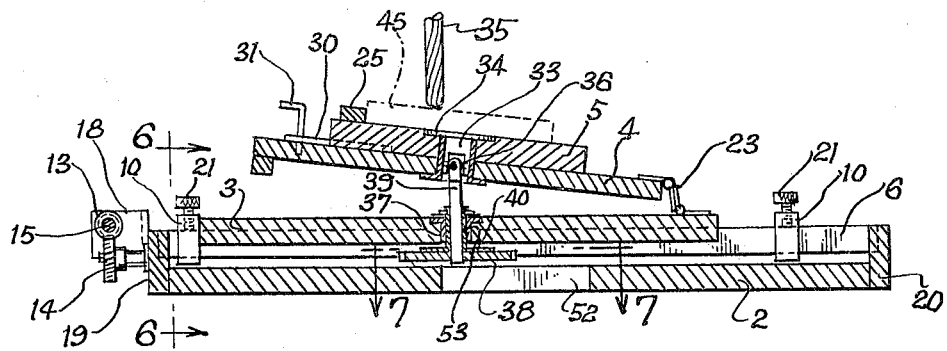
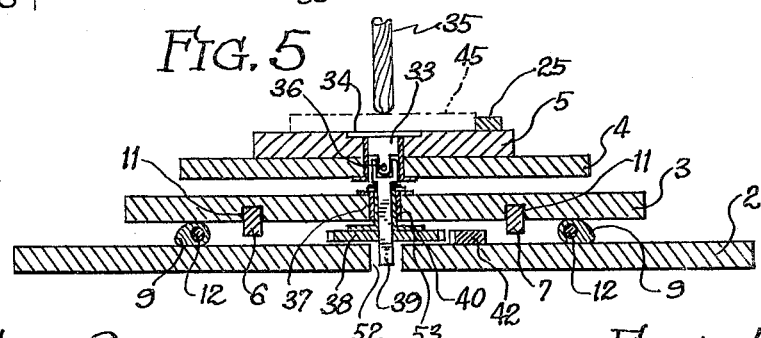
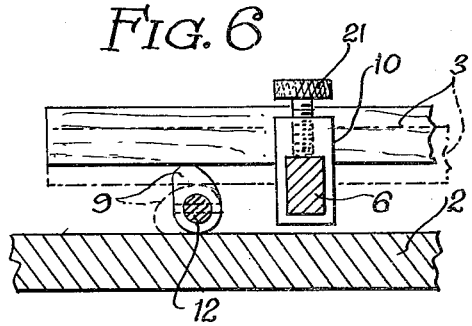
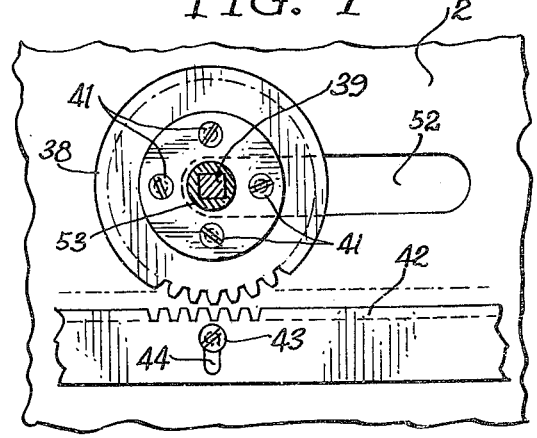
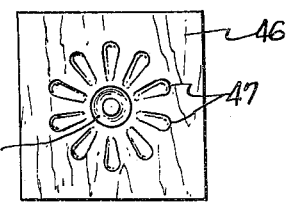
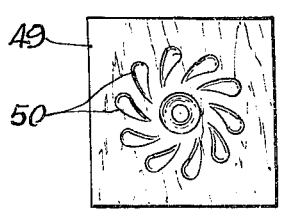
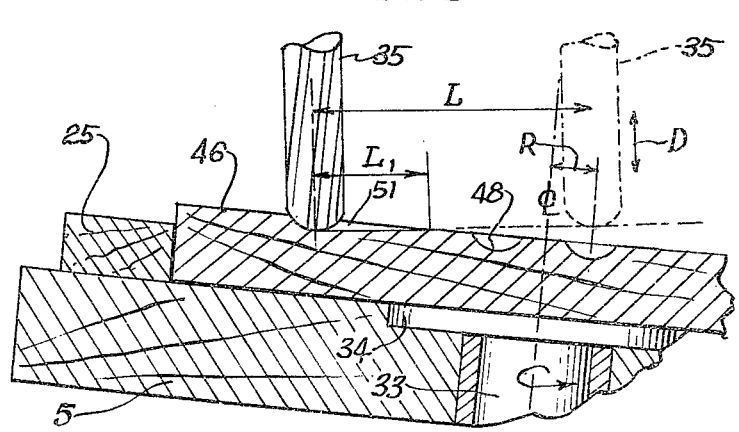

WOODWORKING FIXTURE

BACKGROUND OF THE INVENTION

This invention relates to workbenches and woodworking fixtures. Natural materials such as earth, rocks, wool and in particular, wood, have become very popular in the arts and crafts with both the professional and the amateur craftsman. Decorative engraving on a workpiece of wood can be achieved with a drill press or a router with the help of a guiding pattern. However, it is very difficult to create repetitive designs which remain symmetrical not only on a particular workpiece but also from one workpiece to another. It is also extremely difficult to repetitively and consistently create engraving designs of varying depths without using complex machinery, such as laser beam devices.

SUMMARY OF THE INVENTION

The principal object of this invention is to provide a simple fixture for positioning and guiding a workpiece under a stationary routing head or drill press in order to create engraving which may be consistently repeated within a particular workpiece or between various workpieces.

Another object of this invention is to provide such a fixture whereby the depth of an engraved design can be accurately controlled and progressively varied.

A further object of this invention is to provide a means for turning a simple drill press into an elaborate wood carving machine.

These and other objects of this invention are achieved by a rotating indexing table having a clamp to secure a workpiece thereon which can be slanted at an adjustable angle and is supported by a carriage moving horizontally above a frame installed under a routing head or drill press. The workpiece is guided under the routing bit by the linear movement of the carriage and the rotational movement of the indexing table. The slanted position of the table further results in a variation in the depth of the cut as the carriage progresses under the bit.

BRIEF DESCRIPTION OF THE DRAWING

FIG. 4 is a front to back median section of the fixture with the indexing table shown in an inclined position.
FIG. 5 is a sectional view taken along line 5—5 of FIG. 2;
FIG. 6 is a partial sectional view taken along line 6—6 of FIG. 4;
FIG. 7 is a partial detailed view of the indexing table driving mechanism;
FIG. 8 is a top plan view of a workpiece bearing a first type of engraving design;
FIG. 9 is a top plan view of a workpiece bearing a second type of engraving design;
and
FIG. 10 is a detailed partial sectional view of a workpiece illustrating the action of a routing bit thereupon.

DESCRIPTION OF THE PREFERRED EMBODIMENT OF THE INVENTION

Figure 1:
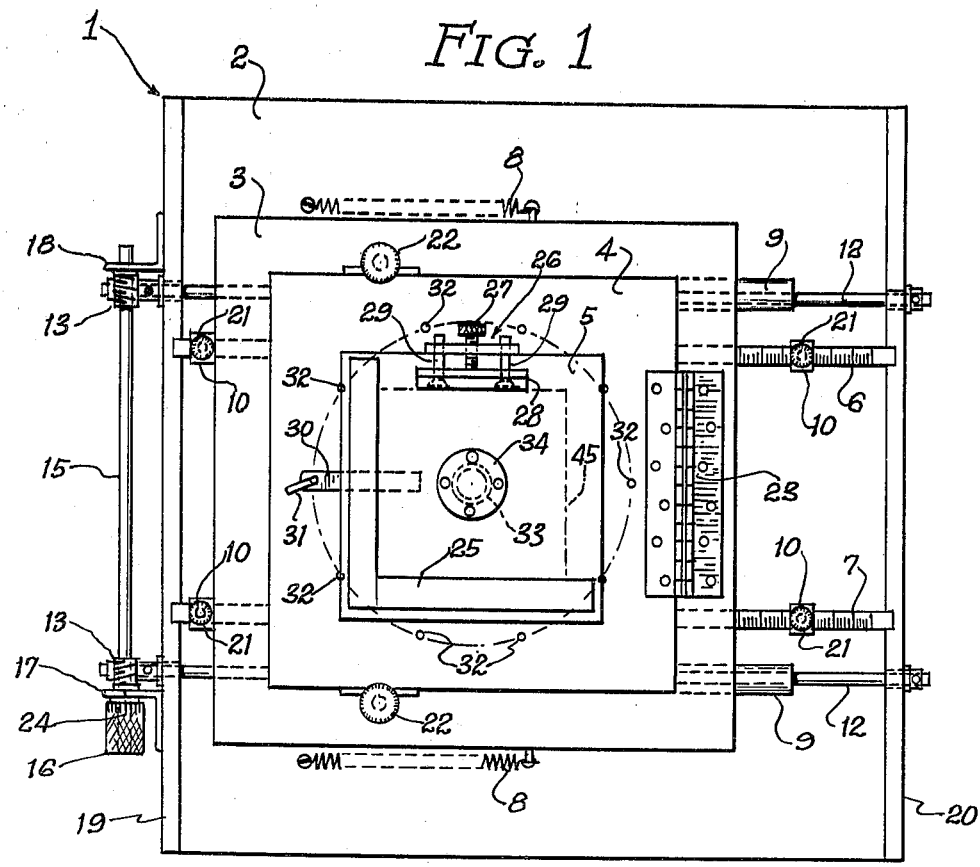
FIG. 1 is a top plan view of the fixture.
Figure 2:
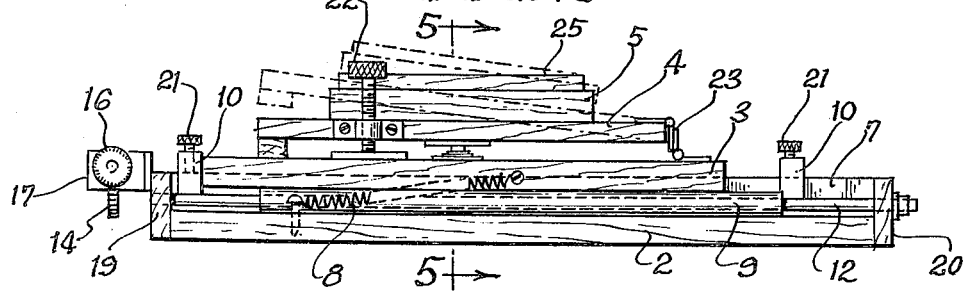
FIG. 2 is an elevational right side view thereof.
Figure 3:
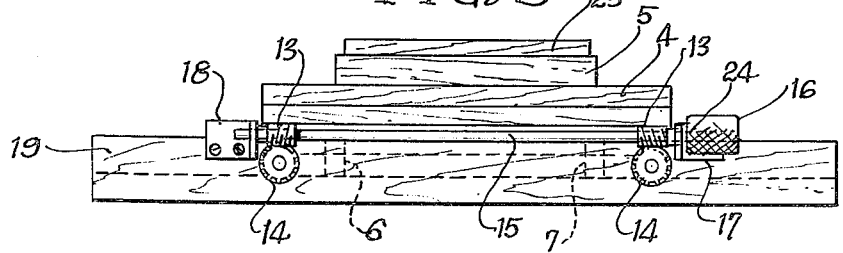
FIG. 3 is an elevational front view thereof.

Referring now to the drawing and according to the invention there is illustrated in FIGS. 1 through 7 a woodworking fixture 1 particularly adapted for making engraved designs into a flat wooden workpiece such as those illustrated in FIGS. 8 and 9. The fixture 1 comprises a flat stationary base 2 having two parallel tracks 6 and 7 mounted from front to back on the top surface of the frame 2. A carriage 3 having underneath a pair of parallel grooves 11 engaged upon the tracks 6 and 7 may be moved from a rest position near the front end piece 19 of the frame 2 toward the back end piece 20 of the frame 2. A set of four stopping clamps 10 riding upon the tracks 6 and 7 and secured thereupon by set screws 21 are used to limit the travel of the carriage 3 in relation to the frame 2. A pair of coil springs 8 stretched between the frame 2 and the sides of the carriage 3 tend to return the carriage toward the rest position. A planar rectangular base 4 is articulately connected to the carriage along its forward edge by a double hinge 23. A pair of adjusting screws 22 captured by the base 4 and acting against the top surface of the carriage 3 are used to selectively adjust the angular position of the base 4 in relation to the top surface of the carriage 3. An indexing table supported by the base 4 has a central shaft 33 extending down through the center of the base 4. The indexing table 5 has a square positioning guide 25 running along two converging edges. A clamp assembly 26 located along one of the other edges of the indexing table 5 is used to secure a workpiece shown only in phantom lines thereupon. The indexing table 5 has a flat arm 30 mounted underneath and extending beyond one of the edges. The indexing table 5 can be rotated around shaft 33 and can be immobilized in any one of a plurality of selected angular positions determined by holes 32 drilled along a circular pattern into the base 4. A L-shaped pin 31 engaged to the end of the arm 30 and plunging into one of the holes 32 is used to immobilize the indexing table 5 in the selected angular position. The workpiece is placed against the guide 25 and secured by tightening the screw 27 of the clamp assembly 26. The screw 27 acts against clamping bar 28 supported by guides 29.

The fixture 1 is designed to position and guide a workpiece against the bit of a router or drill press. The router or drill press is normally placed in a stationary position above the approximate center of the fixture 1. The bit 35 is kept perpendicular to the traveling plane of the carriage 3. Depending upon the type of design to be carved in the workpiece, the base and indexing table can be used in the inclined position illustrated in FIG. 4 or in the horizontal position illustrated in FIG. 5. The tear drop-shaped petals of the design shown in FIG. 8 can be obtained by positioning the workpiece 46 on the indexing table 5 placed in an inclined position sloping down toward the back of the fixture 1 and toward the bit 35. As the carriage is pushed away from the rest position and toward the back of the frame 2, the penetration of the bit 35 into the workpiece 46 increases. The action of the bit 35 into the workpiece 46 is more specifically illustrated in FIG. 10. The length L-1 of the design is determined by the position of the back clamp stops 10. The lateral springs 8 return the carriage to the rest position against the front clamp stop 10 upon release by the operator. The index table 5 is then rotated in preparation for the next teardrop design by securing the arm 30 above the next base hole 32 by means of the pin 31. The length of the cutaway design 51 may also be determined by reference to the scale engraved on the top surface of the tracks 6 and 7. The circular design 48 may be achieved by immobilizing the carriage 3 until the bit 35 comes into contact with the workpiece by means of the clamp stops 10. The bit is then lowered into the workpiece 46 and the indexing table is rotated a full 360°. The scale on tracks 6 and 7 and the clamp stops 10 are used to establish the radius R of the circular design 48 as well as the distance L between the extremities of the tear drop-shaped petals 47 and the circular design 48. The circular design 48 may be achieved with the indexing table placed in an inclined position as illustrated in FIG. 4 or in a horizontal position as illustrated in FIG. 5. The depth D of penetration of the bit 35 into the workpiece 46 can be accurately set by turning the depth control knob 16 which raises the carriage 3 in relation to the frame 2. The knob 16 controls the rotating movement of a shaft 15 having two worm gears 13 and 14. The worm gears are engaged by a set of spur gears 14 associated with two parallel shafts 12 going from the front edge 19 to the back edge 20 of the frame 2 immediately under the carriage 3. A pair of eccentric cams 9 mounted on the parallel shafts 12 act against the bottom of the carriage 3 to lift it as the shafts 12 are rotated. The worm gears 13 and 14 are preferably set so that the rotating movement of the cams 9 are in opposite direction to one another, in order to avoid the imposition of a lateral force on the carriage 3. It should be noticed that the upward movement imposed upon the carriage 3 by the cams 9 is not sufficient to cause the tracks 6 and 7 to escape the grooves 11 in the bottom of the carriage 3. The edge of the depth control knob 16 is marked with a scale 24 which is used in relation with an index mark placed on the shaft bracket 17 to accurately set the depth of penetration of the bit 35 into the workpiece. The comma-shaped petals 50 of the design of workpiece 49 illustrated in FIG. 9 can be achieved by coordinating the rotational movement of the indexing table 5 with the linear movement of the carriage 3. The two movements can be controlled manually by the operator, or the operation can be automatically controlled by means of the indexing table rotating mechanism described below. The pivotal shaft 33 which extends from the indexing table 5 into a bushing in the center of the tiltable base 4 is connected by means of a universal joint 36 to a spline shaft 39. The spline shaft 39 extends through a bushing 37 in the middle of the carriage 3 down to the slot 52 cut in the middle of the frame 2. A spur gear 38 is mounted by means of screws 41 against the lower flange of a bushing 53 captured by the spline shaft 39, so that it is positioned immediately above the top surface of the frame 2. A rack 42 secured on the top surface of the frame 2 cooperates with the spur gear 38 to drive the spline shaft 39 and thus impose a rotating movement to the indexing table 5. The rack 42 is secured on the frame 2 by means of a set of screws 43 engaged into slots 44 so that the rack 42 can be quickly disengaged from the spur wheel 38 when automatic rotation of the indexing table 5 is not desired. The teeth of the rack 42 can be placed in a special pattern corresponding to the desired engraving design. The double hinge 23 between the base 4 and the carriage 3 provides enough lateral fore-and-aft play so that the base 4 can be smoothly tilted to the desired position in spite of the restrictions imposed by the presence of the spline shaft 39.

It can now be understood that the variations in the design which may be accomplished by means of this invention are limited only by the imagination and skill of the operator.

While I have described the preferred embodiment of the invention and suggested various modes of operation, other embodiments may be designed increasing the range of applications, without departing from the scope of this invention and the scope of the appended claims.

The invention claimed is:

1. An apparatus for positioning a workpiece against a stationary routing head where said head spins about a first axis which comprises:
    a supporting frame;
    a traveling carriage slidingly mounted on the frame;
    means for moving the carriage in a first plane perpendicular to said first axis, in a first linear direction toward said head;
    means for holding the workpiece on the carriage on an inclined plane sloping down toward said first direction, whereby the penetration of the routing head into the workpiece increases as the carriage progresses in said first linear direction and said means for holding including a rotating table to mount said workpiece and being rotatable about a second axis perpendicular to said inclined plane;
said means for holding comprising:
    a planar base defining said inclined plane;
    a said rotating table being mounted on the said base; and
    means for placing the base, and thus said table, in a plurality of angular positions in relation to said first plane; and
said means for placing comprising means for articulating the base in relation to the carriage along a third axis perpendicular to said first axis and said first linear direction.

2. The structure claimed in claim 1 wherein said means for holding comprise:
    a planar base defining said inclined plane;
    said rotating table being mounted on said base; and
    means for placing the base, and thus said table, in a plurality of angular positions in relation to said first plane.

3. The structure claimed in claim 1 wherein said means for articulating comprise a hinge along the forward edge of the base.

4. An apparatus for positioning and guiding a workpiece against a stationary routing head where said head spins about a first axis which comprises:
    a supporting frame;
    a traveling carriage slidingly mounted on the frame;
    means for moving the carriage in a first plane perpendicular to said first axis, in a first linear direction toward said head;
    means for holding the workpiece on the carriage on an inclined plane sloping down toward said first direction, whereby the penetration of the routing head into the workpiece increases as the carriage progresses in said first linear direction and said means for holding including a rotating table to mount said workpiece and being rotatable about a second axis perpendicular to said inclined plane; and
    means for rotating the table around said second axis as the carriage progresses in said first linear direction.

5. The structure claimed in claim 4 wherein said means for rotating comprise:
    a second shaft perpendicular to said first plane;
    a universal joint coupling the first shaft to the second shaft under the base;
    a spur gear on the second shaft; and
    a rack mounted on the frame, oriented in said first linear direction and having indentations engaging said spur gear.

6. An apparatus for positioning and guiding a workpiece against a stationary routing head where said head spins about a first axis which comprises:
- a supporting frame;
- a traveling carriage slidingly mounted on the frame;
- means for moving the carriage in a first plane perpendicular to said first axis, in a first linear direction toward said head; and
- means for holding the workpiece on the carriage on an inclined plane sloping down toward said first direction, whereby the penetration of the routing head into the workpiece increases as the carriage progresses in said first linear direction and said means for holding including a rotating table to mount said workpiece and being rotatable about a second axis perpendicular to said inclined plane; and,
- resilient means mounted between said frame and said carriage for moving the carriage in a second linear direction opposite to said first linear direction.

7. An apparatus for positioning and guiding a workpiece against a stationary routing head where said head spins about a first axis which comprises:
- a supporting frame;
- a traveling carriage slidingly mounted on the frame;
- means for moving the carriage in a first plane perpendicular to said first axis, in a first linear direction toward said head;
- means for holding the workpiece on the carriage on an inclined plane sloping down toward said first direction, whereby the penetration of the routing head into the workpiece increases as the carriage progresses in said first linear direction and said means for holding including a rotating table to mount said workpiece and being rotatable about a second axis perpendicular to said inclined plane;
- means for adjusting the position of the base along said first axis comprising:
  - a pair of eccentric cams mounted on the frame parallel to said first plane and contacting the under surface of the carriage; and
  - means for rotating the cams, whereby the spacing between the carriage and the frame is increased or decreased.

* * * * *